United States Patent
Turina et al.

(10) Patent No.: US 10,924,916 B1
(45) Date of Patent: Feb. 16, 2021

(54) CORE NETWORK ALLOCATION HANDLING

(71) Applicant: Telefonaktiebolaget LM Ericsson (publ), Stockholm (SE)

(72) Inventors: Klaus Turina, Herzogenrath (DE); Volker Kleinfeld, Aachen (DE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/642,042

(22) PCT Filed: Nov. 30, 2017

(86) PCT No.: PCT/EP2017/080963
§ 371 (c)(1),
(2) Date: Feb. 26, 2020

(87) PCT Pub. No.: WO2019/105552
PCT Pub. Date: Jun. 6, 2019

(51) Int. Cl.
*H04W 8/08* (2009.01)

(52) U.S. Cl.
CPC ..................... *H04W 8/08* (2013.01)

(58) Field of Classification Search
CPC ........... H04W 8/08; H04W 8/18; H04W 8/20; H04W 8/02; H04W 8/005
See application file for complete search history.

(56) References Cited

U.S. PATENT DOCUMENTS 9,392,435 B2 * 7/2016 Zhang ................. H04L 63/0892
10,111,163 B2 * 10/2018 Vrzic ................. H04W 28/0247
2017/0048695 A1 * 2/2017 Ronneke ................. H04W 8/02
2017/0332226 A1 * 11/2017 Bharatia ................. H04W 48/18
2018/0262979 A1 * 9/2018 Wang ..................... H04W 48/18
2019/0053037 A1 * 2/2019 Shu .......................... H04W 8/08

FOREIGN PATENT DOCUMENTS

WO  2013043088 A1  3/2013
WO  2016151059 A1  9/2016

OTHER PUBLICATIONS

Huawei et al., "Discussion on DCN Selection Based on Usage Type and DCN Type", 3GPP TSG SA WG2 Meeting #113, Frigate Bay, KN, Jan. 25, 2016, pp. 1-8, S2-160519, 3GPP.

(Continued)

*Primary Examiner* — Qutbuddin Ghulamali
(74) *Attorney, Agent, or Firm* — Coats & Bennett, PLLC

(57) ABSTRACT

A system, method, node and computer program for allocating a user equipment, UE, (30) roaming in a visited network (10), to a dedicated core network, DCN, (120) out of a plurality of DCN (120) available in the visited network (10), is provided. The method comprises receiving a trigger comprising a DCN-type indicator from a home network (20) of the roaming UE (30), and determining, responsive to the reception of the DCN-type indicator, whether an DCN-type indicated by the received DCN-type indicator is supported by the visited network (10). The method further comprises determining, if the DCN-type is not supported by the visited network (10), an alternative DCN-type supported by the visited network (10) and allocating, by the visited network (10), the roaming UE (30) to a DCN (120) of the alternative DCN-type.

25 Claims, 4 Drawing Sheets

(56) References Cited

OTHER PUBLICATIONS

3rd Generation Partnership Project, "3rd Generation Partnership Project; Technical Specification Group Services and System Aspects; Telecommunication Management; Study on Management and Orchestration of Network Slicing for Next Generation Network (Release 15)", Technical Report, 3GPP TR 28.801 V15.0.0, Sep. 1, 2017, pp. 1-78, 3GPP.

3rd Generation Partnership Project, "3rd Generation Partnership Project; Technical Specification Group Services and System Aspects; General Packet Radio Service (GPRS) Enhancements for Evolved Universal Terrestrial Radio Access Network (E-UTRAN) Access (Release 15)", Technical Specification, 3GPP TS 23.401 V15.1.0, Sep. 1, 2017, pp. 1-397, 3GPP.

\* cited by examiner

CORE NETWORK ALLOCATION HANDLING

TECHNICAL FIELD

The present invention relates to telecommunications and in particular to a system, method, node and computer program for allocating a user equipment, UE, roaming in a visited network, to a dedicated core network, DCN, out of a plurality of DCN (120) available in the visited network (10).

BACKGROUND

As part of the 3GPP network architecture evolution 3GPP has introduced concepts typically referred to as Dedicated Core Networks, DECOR, and an improved version eDECOR in 3GPP Releases 13 and 14. These mechanisms enable the radio access network to select a Dedicated Core network, DCN, when a user attaches to a serving network. The separation of the network in multiple DCNs serving a specific service need is also referred to as network slicing.

The information to which DCN a user equipment, UE, shall attach is stored as part of the subscriber profile in the Home Subscriber Server, HSS. The Mobility Management Entity, MME, can request information from the HSS to which slice a subscriber belongs, by setting a 'send UE usage type' indicator in a request message to the HSS while processing the initial attach. In a related diameter protocol the information representing the UE characteristics that need to be fulfilled by a dedicated core network is carried in the 'UE usage type' parameter.

When attaching to a visited network at roaming, the DCN to be used is unknown. Therefore, an attaching UE is first connected to a default DCN. When the MME in the default DCN receives the UE usage type information from HSS, the MME analyses if itself is in charge of processing the subscriber or if this type of UE needs to be redirected to another dedicated DCN (also known as network slice instance, NSI).

If the result of this analysis is that a redirection is needed, the MME sends the request for redirection to the Radio Access Network, RAN, together with the information of the correct DCN (e.g. DCN-ID). The RAN then re-attempts the subscriber attachment to a MME in the specified DCN.

The MME in the specified DCN receives the request to register a user and starts the procedure by requesting information from HSS. In that case an analysis in the MME confirms that the UE-usage type is to be served in its own DCN. The MME then confirms the registration via the RAN towards the UE.

Thus, the DCN to be used for the UE at network attachment is set by subscription data in the HSS located in the home network. If the UE is roaming into a foreign network, the subscription data may point to a DCN that is not supported in the visited network. However, the usage of the default DCN may not suit the subscriber's demands on the capabilities of the network.

SUMMARY

There is a clear need for allocating a UE, roaming in a visited network, to a DCN out of a plurality of DCNs available in the visited network. In particular, there is a need to select a DCN, if the DCN as indicated in the subscriber data is not supported in the visited network. This object is achieved by the independent claims. Advantageous embodiments are described in the dependent claims.

According to an exemplary aspect of the invention, a method for allocating a user equipment, UE, roaming in a visited network, to a dedicated core network, DCN, out of a plurality of DCN available in the visited network, is provided. The method comprises receiving a trigger comprising a DCN-type indicator from a home network of the roaming UE, and determining, responsive to the reception of the DCN-type indicator, whether an DCN-type indicated by the received DCN-type indicator is supported by the visited network. The method further comprises determining, if the DCN-type is not supported by the visited network, an alternative DCN-type supported by the visited network, and allocating, by the visited network, the roaming UE to a DCN of the alternative DCN-type.

According to a further exemplary aspect of the invention, a method in a network element for determining a dedicated core network, DCN, out of a plurality of DCN available in a visited network where a roaming UE is located, is provided. The method comprises receiving a trigger comprising a DCN-type indicator from a home network of the roaming UE, and determining, responsive to the reception of the DCN-type indicator, whether an DCN-type indicated by the received DCN-type indicator is supported by the visited network. The method further comprises determining, if the DCN-type is not supported by the visited network, an alternative DCN-type supported by the visited network, and forwarding the received trigger, wherein if an alternative DCN-type was determined, the received DCN-type indicator is replaced by a DCN-type indicator indicating the alternative DCN-type.

According to another exemplary aspect of the invention, a network element for determining a dedicated core network, DCN, out of a plurality of DCN available in a visited network where a roaming UE is located, is provided. The network element is adapted to receive a trigger comprising a DCN-type indicator from a home network of the roaming UE, and to determine, responsive to the reception of the DCN-type indicator, whether an DCN-type indicated by the received DCN-type indicator is supported by the visited network. The network element is further adapted to determine, if the DCN-type is not supported by the visited network, an alternative DCN-type supported by the visited network, and to forward the received trigger, wherein if an alternative DCN-type was determined, the received DCN-type indicator is replaced by a DCN-type indicator indicating the alternative DCN-type.

According to a further exemplary aspect of the invention, a system for allocating a user equipment, UE, roaming in a visited network, to a dedicated core network, DCN, out of a plurality of DCN available in the visited network, is provided. The system comprises a network element, one or more UE, roaming in the visited network, the visited network, comprising a plurality of DCN, and a home network of the UE.

Also provided is a computer program product comprising program code portions to perform the steps of any of the methods presented herein when executed on one or more processors. The computer program product may be stored on computer readable recording medium such as a semiconductor/flash memory, DVD, and so on. The computer program product may also be provided for download via a communication connection.

The foregoing and other objects, features and advantages of the present invention will become more apparent in the following detailed description of embodiments of the invention illustrated in the accompanying drawings.

BRIEF DESCRIPTION OF THE DRAWINGS

Further characteristics and advantages of the invention will become better apparent from the detailed description of particular but not exclusive embodiments, illustrated by way of non-limiting examples in the accompanying drawings, wherein.

DETAILED DESCRIPTION

Figure 1:
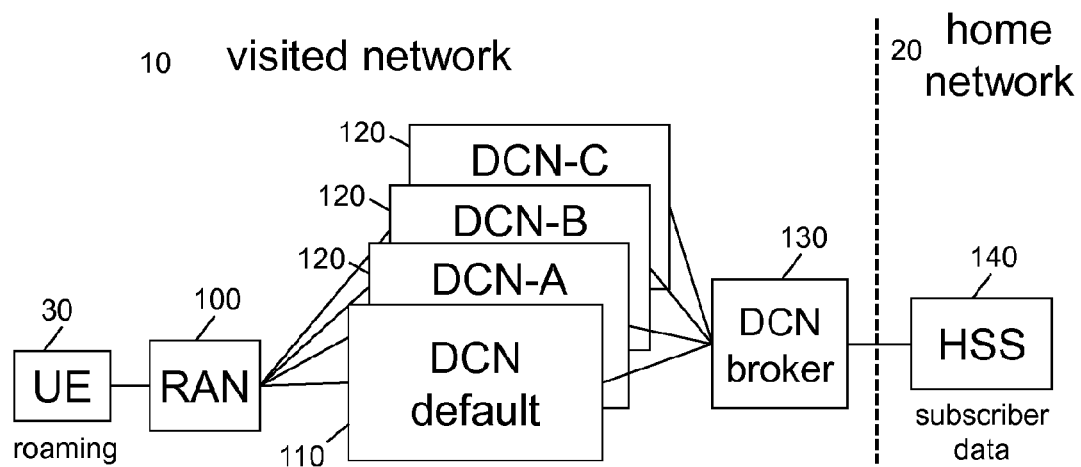
FIG. 1 shows a diagram illustrating a system where a UE is roaming and attaching to a visited network and a DCN broker is handling a mapping of a DCN indicator received from a home network of the UE.

In the following description, for purposes of explanation and not limitation, specific details are set forth in order to provide a thorough understanding of the present disclosure. It will be apparent to one skilled in the art that the present disclosure may be practiced in other implementations that depart from these specific details. For example, while the following implementations will be described with regard to LTE and 5G architectures, it will be understood that the present disclosure shall not be limited to these architectures and that the technique presented herein may be practiced with other cellular/wireless network architectures as well.

Those skilled in the art will further appreciate that the steps, services and functions explained herein below may be implemented using individual hardware circuitry, using software functioning in conjunction with a programmed microprocessor or general-purpose computer, using one or more Application Specific Integrated Circuits (ASICs) and/or using one or more Digital Signal Processors (DSPs). It will also be appreciated that when the present disclosure is described in terms of a method, it may also be embodied in one or more processors and one or more memories coupled to the one or more processors, wherein the one or more memories are encoded with one or more programs that perform the steps, services and functions disclosed herein when executed by the one or more processors.

Within the context of the present application, the term "user equipment" (UE) refers to a device for instance used by a person for his or her personal communication. It can be a telephone type of device, for example a telephone or a SIP phone, cellular telephone, a mobile station, cordless phone, or a personal digital assistant type of device like laptop, notebook, notepad equipped with a wireless data connection. The UE may also be associated with non-humans like animals, plants, or even machines. A UE may be equipped with a SIM (Subscriber Identity Module) comprising unique identities such as IMSI (International Mobile Subscriber Identity) and/or TMSI (Temporary Mobile Subscriber Identity) associated with a subscriber using the UE. The presence of a SIM within a UE customizes the UE uniquely with a subscription of the subscriber.

Within the context of the present application, the term "network" may denote a wireless communication network, or particularly denote a collection of nodes or entities, related transport links, and associated management needed for running a (communication) service, for example a wireless telephony service or a wireless packet transport service. Depending on the service, different node types or entities may be utilized to realize the service. A network operator owns the network and offers the implemented services to its subscribers. Typical components of a wireless communication network are radio access network (such as 2G, GSM, 3G, WCDMA, CDMA, LTE, 5G, WLAN, Wi-Fi), mobile backhaul network, and core network (such as PS Core, EPC, 5G Core).

Within the context of the present application, the term "home network" may denote a network identified by the subscription of the subscriber. A subscriber can have only one home network. In contrast, a "visited network" may be any network outside the home network. In order for a subscriber to receive services in a visited network, the home network operator needs to have an established roaming agreement with the visited network operator. When roaming in a visited network, the UE of the subscriber uses the network resources of the visited network, but the subscription data is retrieved from the home network.

Within the context of the present application, the term "transit network" may refer to a network used for interconnection of networks. Transit networks simplify the peering between networks of different network operators. A network operator just establishes peering with the transit network operator instead of establishing peering with all other communication networks of other network operators.

Within the context of the present application, the term "dedicated core network", DCN, refers to a particular slice of a network. The use of DCN can be to provide specific characteristics and/or functions to a UE, or isolate specific UEs or subscribers (e.g., particular subscribers, e.g. subscribers belonging to a specific enterprise or separate administrative domain, etc.). The main architecture enhancements are to route and maintain UEs in their respective DCN.

Within the context of the present application, the term "service based architecture", SBA, refers to an alternative modeling of a network architecture. In a service based architecture, network functions exhibit their functionality via service-based interfaces, such that other authorized network functions may flexibly use the network function services. Thus, there is shift from "network function" to "network function service". A network function service is a type of capability exposed by a network function (network function service producer) to other network functions (network functions service consumer). Thus, the traditional type of primitive operation: "request-response" are in a service based architecture modeled by a "subscribe-notify" primitive operation. System procedures are then built by invocation of a number of network functions services. A network function service is expected to be self-contained, reusable and use management schemes independently of other network functions services offered by the same network function (e.g. for scaling, healing, etc.).

Now referring to FIG. 1, this figure shows a diagram illustrating a system where a UE is roaming and attaching to a visited network and a DCN broker is handling a mapping of a DCN indicator received from a home network of the UE.

A UE 30 is roaming in a visited network 10. The UE 30 is connected via a RAN 100 to one of the DCN 110/120 available in the visited network 10. Typically, a visited network 10 comprises a default DCN 110, which is used at an initial attach of a UE 30 until the target DCN identified by the subscription of the attaching UE is determined. The default DCN 110 may also be used if there is no dedicated DCN identified by the subscription.

The visited network 10 may comprise a plurality of DCN 110/120, in this figure four different DCN are shown. The DCN in the plurality of DCN may have same, similar, or different capabilities. However at least one of the DCN in the plurality of DCN may have different capabilities. A DCN capability may be the set of supported services, possible bandwidth, fulfillment of latency or jitter constrains, specific routing function, or the like.

The home network 20 hosts the subscription data in a subscription profile for the UE 30. That subscription profile is stored in a HSS database node in the home network 20.

A network element with the function of a DCN broker 130 is located between the plurality of DCN 110/120 and the home network 20. The DCN broker 130 may be located in the visited network 10, or may by alternative be located in a transit network between the visited network 10 and the home network 20 (not shown in the figure).

The position of the DCN broker 130 allows to route signaling messages from a DCN 110/120 to a home network 20 and vice versa through the DCN broker 130. Typically, the DCN broker 130 would be located at the edge of a network, directly interfacing a transit network, or a further network.

Although shown as a single box, the DCN broker 130 may be functionally distributed to different nodes, or may be distributed to different geographical places in order to increase performance and/or redundancy.

A DCN broker 130 may also be co-located with other nodes such as a signaling transfer point, STP, handling SS7 signaling traffic, or Diameter Edge Agent, DEA. A DEA acts as a proxy agent and safeguards all diameter roaming traffic and is typically already capable to decode, analyze and modify signaling messages. So, enhancing the DEA with the DCN broker function could be seen as natural evolution of DEA for supporting a DCN architecture. By alternative, a DCN broker 130 may also be co-located with other nodes in a visited network.

Figure 2:
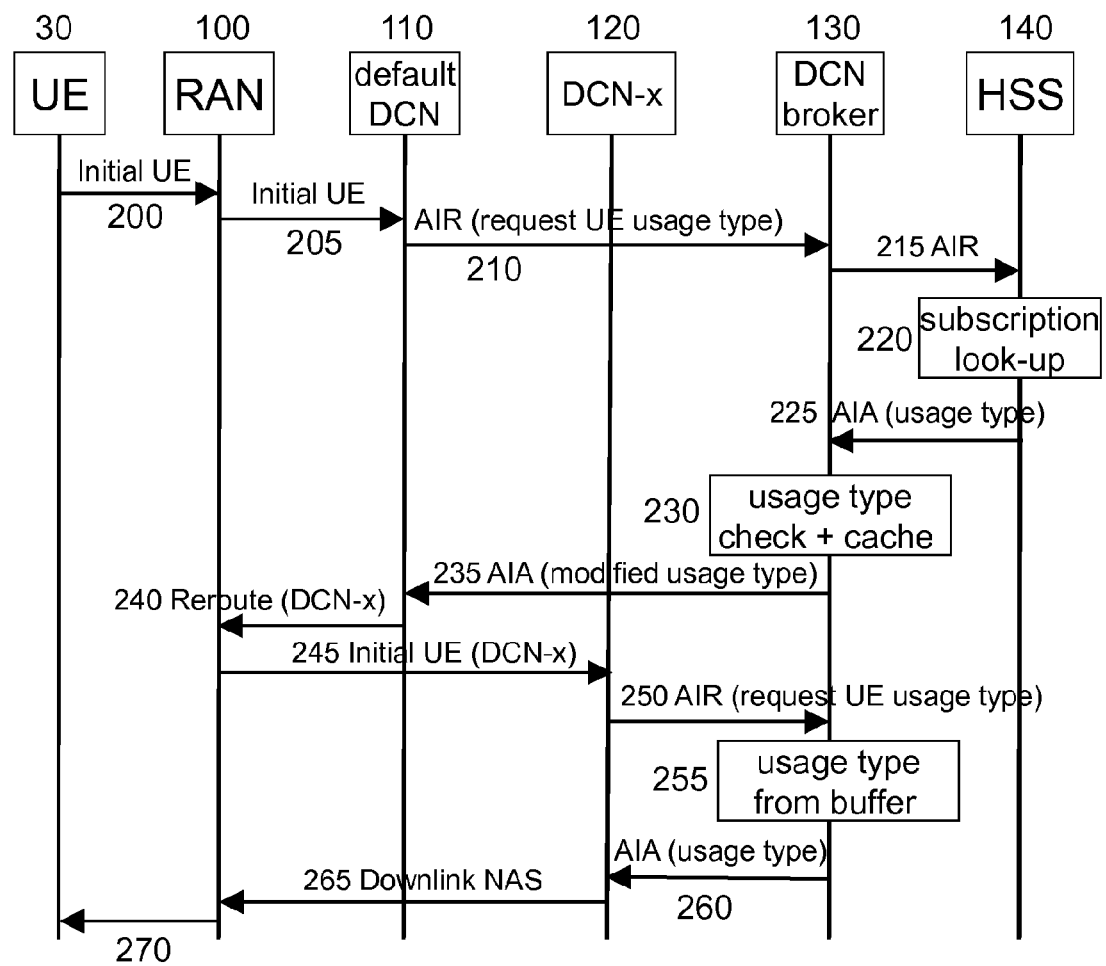
FIG. 2 shows an illustration of a message flow illustrating a use case where a UE is roaming and attaching to a visited network and a DCN broker is handling a mapping of a DCN indicator received from a home network of the UE.

Now referring to FIG. 2, this figure shows an illustration of a message flow illustrating a use case where a UE 30 is roaming and attaching to a visited network 10. This embodiment shows the uses case when implemented via an interexchange of signaling messages. By alternative, this use case may be embodied as a sequence of service calls, for example via a service API. Thus, if a signaling message based architecture is used, such a signaling message may be used to trigger execution of a network function. If a service based architecture is used, service calls via an API may be used to trigger execution of a network function.

A DCN broker 130 is handling a mapping of a DCN indicator received from a home network 20 of the UE 30. The DCN broker 130 may correspond to a network element 130, or may correspond to a network service for DCN brokering.

The figure shows a method for allocating a UE 30 roaming in a visited network 10, to a DCN 120 out of a plurality of DCN 120 available in the visited network 10. The message flow starts when a UE 30 has roamed into a visited network 10 and tries to attach. The UE 30 may send an Initial UE message 200 to the RAN 100.

The RAN 100 receives the Initial UE message 200. Since the UE 30 is new and the RAN 100 does not have any data for the UE 30 available, the RAN 100 forwards the Initial UE message as Initial UE message 205 to the default DCN 110.

The default DCN 110 receives the Initial UE message 205. Since the UE 30 is new and the default DCN 110 does not have any subscriber data for the UE 30 available, the default DCN 110 requests in message 210 subscriber data comprising a DCN indicator from the home network 20 of the UE 30. This request 210 may be an Authentication Information Retrieval, AIR, diameter message sent towards the home network HSS 140 requesting a UE usage type.

This message 210 may be sent via a DCN broker network element 130. Thus, the DCN broker 130 receives the request 210 for subscriber data comprising a DCN indicator. The DCN broker 130 may forward that AIR diameter message 215 unmodified to the home network HSS 140. The home network HSS 140 then receives the AIR diameter message 215 comprising a request for subscriber data comprising a DCN indicator.

In step 220 the home network HSS 140 perform a look-up of the subscriber profile to determine the requested subscription data. Then the home network HSS 140 returns the requested subscription data in message 225, comprising information on the UE usage type indicating a DCN to be used for the attaching UE 30. A DCN-type indicator may be equal to a UE usage type indicator. That message 225 may be a trigger, and that trigger comprises a DCN-type indicator, thus the trigger comprises information from the home network 20 of the roaming UE 30 to derive a DCN-type to be used for the attaching UE 30. The message 225 may be a diameter Authentication Information Answer, AIA, message returned via the DCN broker 130.

The DCN broker 130 receives the AIA message 225 comprising a DCN indicator from a home network 20 of the roaming UE 30. In step 230 the DCN broker 130 is determining, responsive to the reception of the DCN-type indicator, whether an DCN-type indicated by the received DCN-type indicator is supported by the visited network 10. A DCN-type may be supported by the visited network 10, if the visited network 10 comprises at least one DCN 120 adapted to handle UEs 30 having a subscription to that particular DCN-type, and otherwise the DCN-type is not supported.

If the DCN-type is not supported by the visited network 10, the DCN broker 130 determines an alternative DCN-type supported by the visited network 10. The determination of that alternative DCN-type may be based on one or more of several criteria.

The DCN broker 130 may determine an alternative DCN-type based on DCN-types being equivalent to the DCN-type indicated by the received DCN-type indicator. Thus, the DCN broker 130 may compare a list of DCN-types supported by the visited network 10 with the DCN-type indicator received in the AIA message 225 and may select an alternative DCN-type that appears to be equivalent. For example, the DCN-type may indicate a military DCN, then an equivalent DCN would also be of type military.

The DCN broker 130 may determine an alternative DCN-type based on DCN-types matching the intended usage by the UE 30 as derived from the DCN-type indicator. Thus, the DCN broker 130 may compare a list of DCN-types supported by the visited network 10 with the DCN-type indicator received in the AIA message 225 and may select an alternative DCN-type that appears to match the intended usage of the UE 30. For example, the UE 30 may be a sensor having an integrated radio module and providing important telemetric measurements, then a match in the intended usage of the UE 30 would be a DCN that supports UEs for telemetric measurements.

The DCN broker 130 may determine an alternative DCN-type based on additional data available in the subscription of the UE 30. The AIA message 225 may comprise additional subscriber data and the DCN broker 130 may take into account such additional data of the subscriber profile. For example, the DCN broker 130 may consider AMBR (maximum requested bandwidth in UL/DL) or RFSP (RAT-Frequency-Selection-Priority-ID)—see 3GPP TS 23.401 for the meaning of such subscription data. As an additional option, the DCN broker 130 may request such subscriber data in an additional AIR message to the home network HSS 140, or modify the AIR message 215 accordingly such that these additional subscription data would be requested and then received in AIA message 225.

The DCN broker 130 may determine an alternative DCN-type based on a roaming agreement between an operator of the home network 20 and an operator of the visited network 10 and such roaming agreement defining mapping rules for the DCN-type indicator. Thus, the DCN broker 130 may compare a list of DCN-types supported by the visited network 10 with the DCN-type indicator received in the AIA message 225 and may select an alternative DCN-type that is according to a roaming agreement to be used in the visited network 10. For example, requested DCN-type may be military type of DCN, but the roaming agreement between the home and the visited network operator would demand to attach these military users to a law enforcement DCN-type.

Finally, if more than one DCN-types qualifies as alternative DCN-type, the DCN broker 130 may apply a load sharing algorithm. Thus, the DCN broker 130 may compare a list of DCN-types supported by the visited network 10 with the DCN-type indicator received in the AIA message 225 and determines that more than one supported DCN-type would match the requirements for an alternative DCN-type. In this case the DCN broker 130 may use an additional sharing algorithm to select one alternative DCN-type. For example, the DCN broker 130 may use a round robin selection algorithm, or consider a current load in the possible alternative DCN candidates to come to a final selection of the alternative DCN.

Such a logic in the DCN broker 130 assumes that there is at least one of the DCN 120 in the plurality of DCN 120 that has different capabilities, because if all DCN would be equal, the selection would default to a simple load sharing process.

The example message flow of FIG. 2 shows a further optional optimization done by the DCN broker 130. Since the DCN broker 130 has received the subscriber's subscription profile from the home network HSS 140, the DCN broker 130 in step 230 also caches this data.

In step 235 the DCN broker 130 forwards the received AIA message 225, wherein if an alternative DCN-type was determined, the DCN broker 130 replaces a received DCN-type indicator by a DCN-type indicator indicating the alternative DCN-type. Thus, if an alternative DCN-type was inserted, the DCN broker 130 caches the forwarded DCN-type indicator for that particular UE 30.

The AIA message 235 is received by the requesting default DCN 110. The default DCN 110 would determine from the received DCN-type indication, that the UE 30 shall be attached to another DCN 120. Thus, the default DCN 110 sends a Reroute command 240 to the RAN, comprising the DCN-type the UE shall be attached to.

The RAN 100 receives the Reroute command 240 comprising the target DCN-type. The RAN 100 then sends an attach request message 245 to the target DCN. This message 245 may be an Initial UE message comprising a target DCN-type indication.

The target DCN 120 then receives message 245 comprising a target DCN-type indication. Since the target DCN-type is identical to the DCN receiving that message 245, the target DCN determines that it is responsible for attaching the UE 30. Thus, the visited network 10 allocates the roaming UE 30 to a DCN 120 of the alternative DCN-type.

Since the UE 30 is new in the target DCN 120, the target DCN 120 may fetch the subscriber's profile by requesting the subscription data from the home network HSS 140. As described already above in step 210, the DCN 120 requests the subscription data by sending an AIR message 250 to the DCN broker 130.

The DCN broker 130 receives a request for a DCN-type indicator destined to the home network 20, the AIR message 250. In step 255 the DCN broker 130 checks if the request is for a UE 30 for which the DCN-type indicator was cached. If so the DCN broker 130 returns the cached DCN-type indicator, without forwarding the request to the home network 20. The DCN broker 130 returns the cached DCN-type indicator and other cached subscription data for the UE 30 in a AIA message 260 to the requesting DCN 120. The attachment of the UE 30 and the allocation of the UE 30 to the DCN 120 is finalized by the DCN 120 sending message 265 Downlink NAS to the RAN 100, which then confirms to the UE in message 270.

The FIG. 2 shows an example using network functions and messages between those network function in order to realize a network function. Thus, messages may be used as trigger and the message may also be used to carry required data between the network functions. The service based architecture, SBA, would be equally suited to model an alternative example to realize a network function service for allocating a UE 30 roaming in a visited network 10, to a DCN 120 out of a plurality of DCN 120 available in the visited network 10. In such modeling example, the DCN broker 130 may be DCN brokering function service being called from a visited network 10. In this case a service call may be used to trigger the network function service. The function call may be used to carry required data between the network function services. An embodiment using SBA is equivalent to a function and message based embodiment as of FIG. 2.

FIG. 2 does not show where actually the DCN broker 130 is located. In a first option, the DCN broker 130 may be located in the visited network 10, preferably at the edge of such visited network 10 interfacing a transit network or directly a further network such as the home network 20. In a further alternative the DCN broker 130 may be located in a transit network located between the visited network 10 and the home network 20. In this case an operator of the transit network may offer such DCN brokering services. In addition, the transit network operator may also offer the subscriber data caching as described above, as part of the DCN brokering service, or as a separate service to reduce signaling between networks. Especially if the home network of a roaming UE is far away, a caching service in a transit network may be of particular relevance for saving resources.

Figure 3:
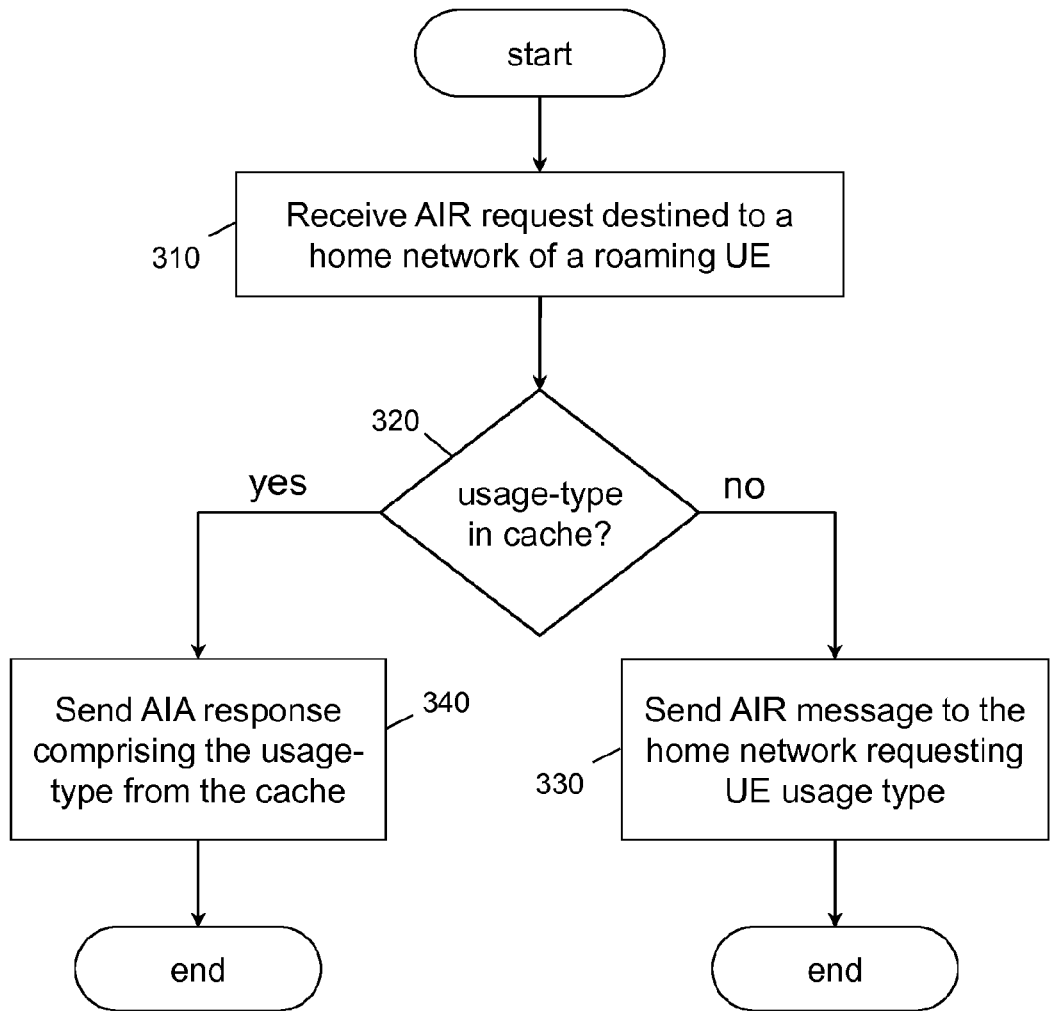
FIG. 3 shows a flow diagram in a DCN broker when receiving a request for DCN information from a visited network MME targeted towards a home network.

Now referring to FIG. 3, this figure shows a flow diagram in a DCN broker when receiving a request for DCN-information, the request being triggered by a MME of a visited network. The DCN broker receives the request from the MME in the visited network and asks for DCN information from the home network. The DCN broker may be the DCN broker 130 as shown in the previous figures. This flow diagram shows an embodiment where the DCN broker is triggered by a signaling message, i.e. the trigger is a signaling message. By alternative, the DCN broker may be embodied as a DCN broker service, which is called by an invocation via a service API. In this case the trigger may be a service call.

The flow starts in step 310 when the DCN broker receives an AIR diameter message destined to a home network of a UE roaming in the visited network. The visited network is a roaming partner of the home network, meaning that UEs of the home network are allowed to use the visited network when roaming. The AIR message may correspond to the message 210 in FIG. 2. The message may comprise a request for a DCN indication in a form of a UE usage type. Other data of the subscription profile may also be requested.

In step 320 the DCN broker checks if the requested data is available within the data cached in the DCN broker. Storing of data in the cache is described in FIG. 4. If the requested data is available within the data cached in the DCN broker, the flow continues with step 340. If the requested data is not found within the data cached in the DCN broker, or if that data in the cache is e.g. outdated, the flow continues with step 330.

In step 330 the DCN broker does not utilize any data from the cache, and thus the DCN broker forwards the AIR message to the home network HSS. That message may correspond to message 215 in FIG. 2. Then the flow ends.

In step 340 the DCN broker does utilize data stored in the cache. The DCN broker then responds by sending an AIA message. That message may correspond to message 260 in FIG. 2. Then the flow ends.

If the DCN broker has returned cached information, due to the fact that the AIR message did not reach the home network HSS, that home network HSS does not get to know the currently serving DCN. Thus, the DCN broker may, for a short while, redirect home network HSS initiated messages to the actually serving DCN. This applies also to other messages from the home network, such as messages related to for example location services, thus, any home network generated message may be rerouted to the serving MME in the actually serving DCN. Such redirection may be required until the next DCN initiated procedure, e.g. an update location procedure to the home network HSS, is successfully performed.

By alternative, if the DCN broker is embodied as a DCN broker service, the response 330 or 340 may be a service invocation result returned via a service API.

Figure 4:
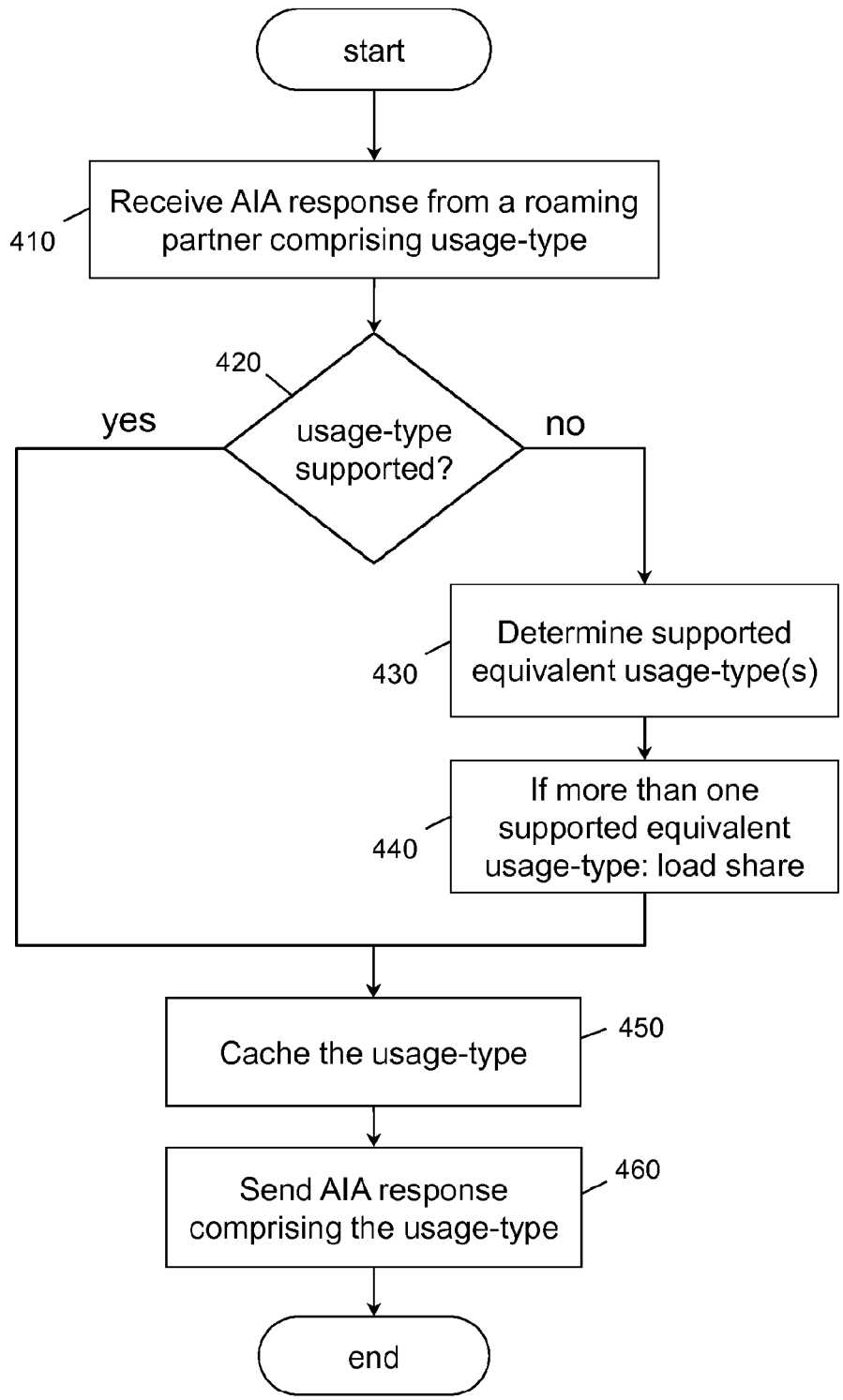
FIG. 4 shows a flow diagram in a DCN broker when receiving a response from a home network on a request for DCN information.

Now referring to FIG. 4, this figure shows a flow diagram in a DCN broker when receiving a response from a home network on a request for a DCN indicator. The DCN broker may be the DCN broker 130 as shown in the previous figures. This flow diagram shows an embodiment where the DCN broker is triggered by a signaling message, i.e. the trigger is a signaling message. By alternative, the DCN broker may be embodied as a DCN broker service, which is called by an invocation via a service API. In this case the trigger may be a service call.

The flow starts in step 410 when the DCN broker receives an AIA diameter message from a home network of a UE roaming in the visited network. The visited network is a roaming partner of the home network, meaning that UEs of the home network are allowed to use the visited network when roaming. The AIA message may correspond to the message 225 in FIG. 2. The message may comprise a DCN indication in a form of a UE usage type. Other data of the subscription profile may also be provided in that AIA message.

In step 420 the DCN broker checks whether the DCN-type as indicated by the UE usage-type is supported in the visited network. If the answer to this check is yes, the DCN-type as indicated by the UE usage-type is supported in the visited network, the flow continues in step 450. Otherwise, if the DCN-type as indicated by the UE usage-type is not supported in the visited network, the flow continues in step 430.

In step 430 the DCN broker determines an alternative DCN-type that would be supported by the visited network, and which would be equivalent to the received, not supported DCN-type. The determination of an alternative DCN-type may imply a number of sub-steps as described above for step 230 in FIG. 2.

If the determination of an alternative DCN-type by the DCN broker has resulted in more than one supported DCN-type being equivalent, the DCN broker may apply in step 440 e.g. a load sharing algorithm in order to finally select the alternative DCN-type.

When step 450 is reached, the DCN-type to be returned to the requesting DCN is decided. When coming directly from check 420 to step 450, the received DCN-type is supported by the visited network, and that received DCN-type shall be returned. When coming from step 440, the DCN-type to be returned is the determined alternative DCN-type. In step 450 the DCN-type to be returned is stored in the cache. Also other data received in the AIA message may be stored in the cache. The information in the cache may be used in step 320 and 340 of FIG. 3.

In step 460 the AIA response message is sent to the requesting DCN. That message may correspond to message 235 in FIG. 2. Then the flow ends.

By alternative, if the DCN broker is embodied as a DCN broker service, the response 360 may be a service invocation result returned via a service API.

Figure 5:
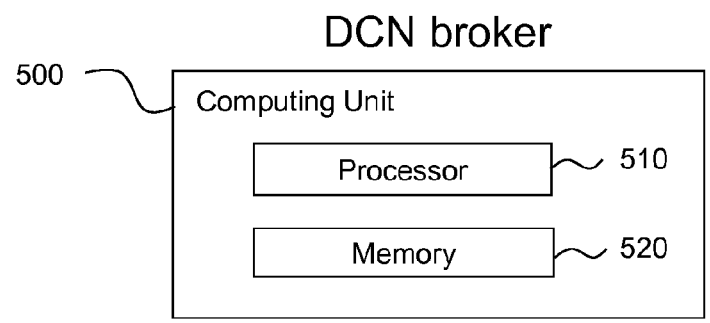
FIG. 5 shows an exemplary composition of a computing unit configured to execute a DCN broker according to the present disclosure.

Now referring to FIG. 5, this figure shows an exemplary composition of a computing unit configured to execute a DCN broker according to the present disclosure. The DCN broker may be the DCN broker 130 as shown in the previous figures.

The computing unit 500 comprises at least one processor 510 and at least one memory 520, wherein the at least one memory 520 contains instructions executable by the at least one processor 510 such that the computing unit 500 is operable to carry out the method steps described in FIGS. 3 and 4 with reference to the DCN broker.

It will be understood that the computing unit 500 may be a physical computing unit as well as virtualized computing unit, such as virtual machine, for example. It will further be appreciated that the computing unit may not necessarily be implemented as standalone computing unit, but may be implemented as components—realized in software and/or hardware—residing on multiple distributed computing units as well.

Figure 6:
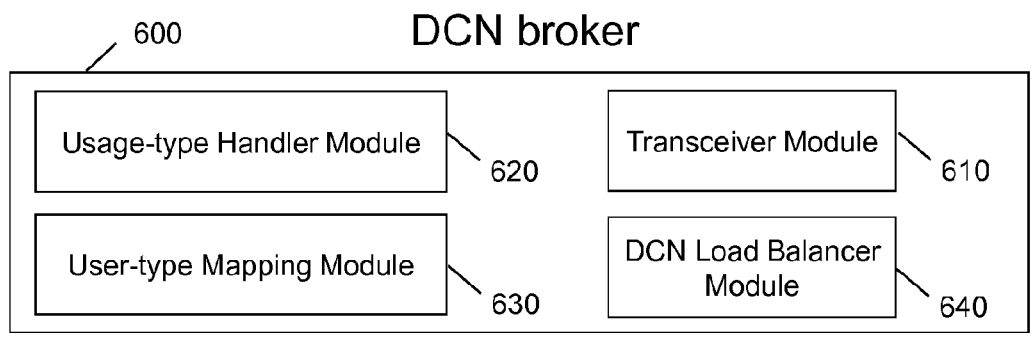
FIG. 6 shows an exemplary modular function composition of a computing unit configured to execute a DCN broker according to the present disclosure and a corresponding method which may be performed by a DCN broker.

Now referring to FIG. 6, this figure shows an exemplary modular function composition of a computing unit configured to execute a DCN broker according to the present disclosure and a corresponding method which may be performed by a DCN broker. The DCN broker may be the DCN broker 130 as shown in the previous figures.

The Transceiver Module 610 may be adapted to perform reception and sending of signaling messages, such as step 310, 330, 340, 410, 460, and any signaling messages related to a method in a DCN broker for determining a DCN out of a plurality of DCN available in a visited network where a roaming UE is located. The Transceiver Module 610 may also be adapted to send/receive service calls instead of sending/receiving messages, if an SBA network architecture is applied.

The Usage-type Handler Module 620 may be adapted to extract a UE usage type or similar DCN-type indicator from a received message, or to insert such indicator into a message to be sent. That module may also interface the cache to insert and retrieve data from the cache. That cache may be implemented in the memory 520. That module may also perform the DCN-type related checks 320 and 420.

User-type Mapping Module 630 may be adapted to perform the determination of an alternative DCN-type as of step 430.

DCN Load Balancer Module 640 may be adapted to perform a load balancing algorithm in case there are more than one supported equivalent DCN-type as of step 440.

According to another embodiment, a computer program is provided. The computer program may be executed by the processor 510 in the computing unit 500 of the above mentioned DCN broker such that a method for allocating a UE roaming in a visited network, to a DCN out of a plurality of DCN available in the visited network as described above with reference to FIG. 3 or 4 may be carried out or be controlled. In particular, the DCN broker may be caused to operate in accordance with the above described method by executing the computer program.

The computer program may be embodied as computer code, for example of a computer program product. The computer program product may be stored on a computer readable medium, for example a disk or the memory 520 of the computing unit 500 of the DCN broker, or may be configured as downloadable information.

One or more embodiments as described above may enable at least one of the following technical effects:
- fully self-contained introduction of DCN, independent from roaming partners
- no need to (re-)negotiate roaming agreements
- independent timing of DCN introduction
- easy to change DCN-types and DCN-type values in the own network
- increased security and visibility by safeguarding received DCN-type values
- mapping of unknown usage types to equivalent values by means of evaluating additional criteria
- configuration in single DCN broker node instead of many MMEs
- reduced roaming signaling traffic to HSS Modifications and other embodiments of the disclosed invention will come to mind to one skilled in the art having the benefit of the teachings presented in the foregoing descriptions and the associated drawings. Therefore, it is to be understood that the embodiments are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method for allocating a roaming user equipment (UE), roaming in a visited network, to a dedicated core network (DCN) out of a plurality of DCN available in the visited network, the method comprising:
   receiving a trigger comprising a DCN-type indicator from a home network of the roaming UE;
   determining, responsive to the reception of the DCN-type indicator, whether a DCN-type indicated by the received DCN-type indicator is supported by the visited network;
   determining, in response to the DCN-type not being supported by the visited network, an alternative DCN-type supported by the visited network; and
   allocating, by the visited network, the roaming UE to a DCN of the alternative DCN-type.

2. The method of claim 1, wherein the trigger is a signaling message.

3. The method of claim 1, wherein the trigger is a service call.

4. The method of claim 1, wherein at least one of the DCN in the plurality of DCN has different capabilities.

5. The method of claim 1, wherein a DCN-type is deemed supported by the visited network when the visited network comprises at least one DCN adapted to handle UEs having a subscription to that particular DCN-type, otherwise the DCN-type is deemed not supported.

6. The method of claim 1, wherein the determining the alternative DCN-type is based on:
   DCN-types being equivalent to the DCN-type indicated by the received DCN-type indicator;
   DCN-types matching the intended usage by the UE as derived from the DCN-type indicator;
   additional data available in the subscription of the UE;
   a roaming agreement between an operator of the home network and an operator of the visited network, with such roaming agreement defining mapping rules for the DCN-type indicator; and/or
   a load sharing algorithm when the more than one DCN-types qualify.

7. The method of claim 1, wherein the receiving, the determining whether the DCN-type indicated by the received DCN-type indicator is supported by the visited network, and the determining the alternative DCN-type supported by the visited network are executed by a network element in the visited network.

8. The method of claim 1, wherein the receiving, the determining whether the DCN-type indicated by the received DCN-type indicator is supported by the visited network, and the determining the alternative DCN-type supported by the visited network are executed by a network element in a transit network located between the visited network and the home network.

9. The method of claim 7, further comprising:
   forwarding the received trigger by the network element;
   wherein when the alternative DCN-type was determined, the received DCN-type indicator in the trigger is replaced by a DCN-type indicator indicating the alternative DCN-type prior to the forwarding.

10. The method of claim 9, further comprising caching, by the network element, the forwarded DCN-type indicator for a particular UE.

11. The method of claim 10, further comprising the network element:
   receiving a request for a DCN-type indicator destined to the home network; and when the request is for a UE for which the DCN-type indicator was cached, returning the cached DCN-type indicator without forwarding the request to the home network.

12. A method, in a network element, for determining a dedicated core network (DCN) out of a plurality of DCN available in a visited network where a roaming UE is located, the method comprising the network element:
receiving a trigger comprising a DCN-type indicator from a home network of the roaming UE;
determining, responsive to the reception of the DCN-type indicator, whether a DCN-type indicated by the received DCN-type indicator is supported by the visited network;
determining, in response to the DCN-type not being supported by the visited network, an alternative DCN-type supported by the visited network; and
forwarding the received trigger;
wherein when the alternative DCN-type was determined, the received DCN-type indicator in the trigger is replaced by a DCN-type indicator indicating the alternative DCN-type prior to the forwarding.

13. The method of claim 12, wherein the trigger is a signaling message.

14. The method of claim 12, wherein the trigger is a service call.

15. The method of claim 12, wherein at least one of the DCN in the plurality of DCN has different capabilities.

16. The method of claim 12, wherein a DCN-type is deemed supported by the visited network when the visited network comprises at least one DCN adapted to handle UEs having a subscription to that particular DCN-type, otherwise the DCN-type is deemed not supported.

17. The method of claim 12, wherein the determination of an alternative DCN-type is based on:
DCN-types being equivalent to the DCN-type indicated by the received DCN-type indicator;
DCN-types matching the intended usage by the UE as derived from the DCN-type indicator;
additional data available in the subscription of the UE;
a roaming agreement between an operator of the home network and an operator of the visited network, with such roaming agreement defining mapping rules for the DCN-type indicator; and/or
a load sharing algorithm when the more than one DCN-types qualify.

18. The method of claim 12, wherein the network element is located in the visited network.

19. The method of claim 12, wherein the network element is located in a transit network located between the visited network and the home network.

20. The method of claim 12, further comprising the network element caching the forwarded DCN-type indicator for a particular UE.

21. The method of claim 20, further comprising the network element:
receiving a request for a DCN-type indicator destined to the home network; and
when the request is for a UE for which the DCN-type indicator was cached, returning the cached DCN-type indicator without forwarding the request to the home network.

22. A network element for determining a dedicated core network (DCN) out of a plurality of DCN available in a visited network where a roaming UE is located, the network element comprising:
processing circuitry;
memory containing instructions executable by the processing circuitry whereby the network element is operative to:
receive a trigger comprising a DCN-type indicator from a home network of the roaming UE;
determine, responsive to the reception of the DCN-type indicator, whether an DCN-type indicated by the received DCN-type indicator is supported by the visited network;
determine, in response to the DCN-type not being supported by the visited network, an alternative DCN-type supported by the visited network; and
forward the received trigger;
wherein when the alternative DCN-type was determined, the received DCN-type indicator in the trigger is replaced by a DCN-type indicator indicating the alternative DCN-type prior to the forwarding.

23. A system for allocating a roaming user equipment (UE), roaming in a visited network, to a dedicated core network (DCN) out of a plurality of DCN available in the visited network, the system comprising:
a network element;
one or more roaming UE, roaming in the visited network, including a first roaming UE;
the visited network, comprising a plurality of DCN; and
a home network of the first roaming UE;
wherein the network element is operative to:
receive a trigger comprising a DCN-type indicator from a home network of the first roaming UE;
determine, responsive to the reception of the DCN-type indicator, whether an DCN-type indicated by the received DCN-type indicator is supported by the visited network;
determine, in response to the DCN-type not being supported by the visited network, an alternative DCN-type supported by the visited network; and
forward the received trigger;
wherein when the alternative DCN-type was determined, the received DCN-type indicator in the trigger is replaced by a DCN-type indicator indicating the alternative DCN-type prior to the forwarding.

24. A non-transitory computer readable recording medium storing a computer program product for controlling a network element for allocating a roaming user equipment (UE), roaming in a visited network, to a dedicated core network (DCN) out of a plurality of DCN available in the visited network, wherein the network element is in the visited network, the computer program product comprising program instructions which, when run on processing circuitry of the network element, causes the network element to:
receive a trigger comprising a DCN-type indicator from a home network of the roaming UE;
determine, responsive to the reception of the DCN-type indicator, whether a DCN-type indicated by the received DCN-type indicator is supported by the visited network;
determine, in response to the DCN-type not being supported by the visited network, an alternative DCN-type supported by the visited network; and
allocate, by the visited network, the roaming UE to a DCN of the alternative DCN-type.

25. A non-transitory computer readable recording medium storing a computer program product for controlling a network element for determining a dedicated core network (DCN) out of a plurality of DCN available in a visited network where a roaming UE is located, wherein the network element is in a transit network located between the visited network and the home network, the computer program product comprising program instructions which, when run on processing circuitry of the network element, causes the network element to:
- receive a trigger comprising a DCN-type indicator from a home network of the roaming UE;
- determine, responsive to the reception of the DCN-type indicator, whether a DCN-type indicated by the received DCN-type indicator is supported by the visited network;
- determine, in response to the DCN-type not being supported by the visited network, an alternative DCN-type supported by the visited network; and
- forward the received trigger;
- wherein when the alternative DCN-type was determined, the received DCN-type indicator in the trigger is replaced by a DCN-type indicator indicating the alternative DCN-type prior to the forwarding.

\* \* \* \* \*

UNITED STATES PATENT AND TRADEMARK OFFICE
CERTIFICATE OF CORRECTION

PATENT NO. : 10,924,916 B1
APPLICATION NO. : 16/642042
DATED : February 16, 2021
INVENTOR(S) : Turina et al.

Page 1 of 1

It is certified that error appears in the above-identified patent and that said Letters Patent is hereby corrected as shown below:

In the Specification

In Column 5, Line 21, delete "constrains," and insert -- constraints, --, therefor.

Signed and Sealed this
Twenty-second Day of June, 2021

Drew Hirshfeld
*Performing the Functions and Duties of the
Under Secretary of Commerce for Intellectual Property and
Director of the United States Patent and Trademark Office*